United States Patent
Mayer et al.

(10) Patent No.: US 7,835,014 B2
(45) Date of Patent: Nov. 16, 2010

(54) POSITION MEASURING ARRANGEMENT

(75) Inventors: Elmar Mayer, Nußdorf (DE); Johann Oberhauser, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 65 days.

(21) Appl. No.: 12/284,127

(22) Filed: Sep. 18, 2008

(65) Prior Publication Data
US 2009/0079996 A1  Mar. 26, 2009

(30) Foreign Application Priority Data
Sep. 22, 2007 (DE) .......................... 10 2007 045 362

(51) Int. Cl.
*G01B 11/14* (2006.01)
*G01D 5/34* (2006.01)

(52) U.S. Cl. ................. 356/608; 356/607; 356/629; 356/639; 356/617; 250/231.13

(58) Field of Classification Search .......... 356/614, 356/607, 608, 617, 636, 616; 250/231.13–231.18, 250/566, 237 G, 559.44; 341/15, 16; 33/706, 33/707
See application file for complete search history.

(56) References Cited

U.S. PATENT DOCUMENTS

| 4,507,647 | A | * | 3/1985 | Minami et al. ............... 341/13 |
|---|---|---|---|---|
| 4,631,519 | A | | 12/1986 | Johnston | |
| 4,701,615 | A | * | 10/1987 | Schmitt ................... 250/237 G |
| 6,038,523 | A | | 3/2000 | Akahane et al. | |
| 6,742,275 | B2 | | 6/2004 | Mayer et al. | |
| 6,760,682 | B1 | | 7/2004 | Schwabe | |
| 6,987,465 | B2 | * | 1/2006 | Mittmann .................... 341/15 |
| 7,013,575 | B2 | * | 3/2006 | Strasser et al. ................ 33/706 |
| 7,030,368 | B2 | * | 4/2006 | Strasser ................. 250/231.13 |
| 7,164,120 | B2 | * | 1/2007 | Strasser ................. 250/231.16 |
| 2005/0072016 | A1 | | 4/2005 | Strasser et al. | |
| 2007/0186431 | A1 | * | 8/2007 | Mittmann et al. ............. 33/707 |
| 2009/0161121 | A1 | * | 6/2009 | Oberhauser et al. .......... 356/617 |

FOREIGN PATENT DOCUMENTS

| DE | 102 44 235 A1 | 3/2004 |
|---|---|---|
| EP | 0 841 538 B1 | 2/2003 |
| EP | 1 206 684 B1 | 11/2004 |
| GB | 2 126 444 A | 3/1984 |
| JP | 01-318920 A | 12/1989 |

\* cited by examiner

*Primary Examiner*—Sang Nguyen
(74) *Attorney, Agent, or Firm*—Brinks Hofer Gilson & Lione

(57) ABSTRACT

A method for absolute position measuring that includes scanning a code having code elements arranged one behind the other in a measuring direction, wherein the code elements include sequential first and second code elements which define a code word containing absolute position information. The method including generating scanning signals within the first code elements and the second code elements. The method further including forming information regarding the sequential first and second code elements from the scanning signals via a reference value and determining the reference value as a function of at least one of the scanning signals within the first code elements and the scanning signals within the second code elements.

17 Claims, 3 Drawing Sheets

US 7,835,014 B2

POSITION MEASURING ARRANGEMENT

RELATED APPLICATIONS

Applicants claim, under 35 U.S.C. §119, the benefit of priority of the filing date of Sep. 22, 2007 of a German patent application, copy attached, Ser. No. 10 2007 045 362.2, filed on the aforementioned date, the entire contents of which is incorporated herein by reference.

BACKGROUND

1. Technical Field

The present invention relates to a position measuring arrangement including a code having a sequence of code elements arranged one behind the other in the measuring direction, in which several sequential code elements each constitute a code word containing absolute position information. The arrangement further includes a scanning arrangement, having a detector unit with several detector elements for scanning the code elements, each of which constitutes a code word, and for forming at least one scanning signal within respectively one of the code elements. An evaluating unit with assessment arrangements, in which the at least one scanning signal of a code element is supplied to respectively one of the assessment arrangements, and by which information for the corresponding code word can be formed by at least one reference value.

2. Background Information

Absolute position measuring arrangements are increasingly employed in many fields, in which absolute position information is derived from a code track with code elements, which are arranged one behind the other in the measuring direction. In this case, the code elements are provided in a pseudo-random distribution, so that a defined number of code elements following each other forms a respective bit pattern. In the course of the displacement of the scanning arrangement by a single code element with respect to the code track, a fresh bit pattern is already formed, and a sequence of different bit patterns is available over the entire measuring range to be detected in an absolute manner.

Such a sequential code is called a chain code or a pseudo-random code (PRC).

A position measuring arrangement with such a code is described in GB 2 128 444 A. The information regarding each code word of this code is determined by comparing the scanning signal of the code word with a fixed, preset reference value. A logical "0" is formed, if the scanning signal lies below the preset reference value, and a logical "1" is formed, if the scanning signal lies above the preset reference value.

A position measuring arrangement with Manchester coding is described in DE 102 44 235 A1. This position measuring arrangement has a code including a sequence of code elements arranged one behind the other in the measuring direction, in which each code element respectively includes two partial areas which are complementary to each other and are arranged following each other in the measuring direction. This code is scanned by a scanning arrangement by several detector elements. In a comparison arrangement a comparison result is formed from the respective scanning signals from the partial areas of a code element, and a check is made by a checking arrangement whether the result of the comparison lies above or below a fixedly preset reference value, and depending on this, a bit value "0" or "1" is derived as information from the respective code element. Additionally, a check is made whether the result of the comparison lies within or outside of a range predetermined by a further reference value. Depending on the result from this check, further information regarding the code word is derived. If the result of the check lies within the predetermined range, an error signal is generated for the respective code element, which states that the bit value derived from this code element is unreliable.

In connection with this, the reference value for forming the bit value is fixedly preset. The range for checking the reliability of the bit value is also fixedly preset once.

This has the disadvantage that, in case of a reduction of the amplitudes of the analog scanning signal in the course of operation, error signals are increasingly generated.

A position measuring arrangement with a serial, or respectively sequential code, is also described in JP 1-318920 A. The code includes two code tracks arranged parallel with respect to each other. One of these code tracks has a sequence of code words, which are arranged in the measuring direction and form bit patterns, which can be unequivocally differentiated from each other, over the entire measuring range. The code elements of the second code track arranged next to it are designed inversely to the code elements of the first code track, and a bit "0" or "1" of a code word is respectively determined by forming the difference between the code elements, which are located next to each other and are formed inversely with respect to each other.

A step for adapting the comparison threshold for the scanning signals of the serial code to the conditions of the surroundings is disclosed in EP 0 841 538 B1. A detector is provided for this, which scans a location outside of the sequential code and provides a signal, by which the comparison threshold can be adapted.

It is disadvantageous in this case that the states detected by this additional detector do not correspond to the states at the location of the code, so that erroneous interpretations of the code elements can occur.

OBJECTS AND SUMMARY OF THE INVENTION

It is therefore an object of the present invention to provide an absolute position measuring arrangement, by which a correct absolute position is generated with great dependability, in connection with which availability and dependability are very great.

This object is attained by at least one adaptation arrangement for determining the reference value as a function of at least one of the scanning signals of the code elements.

The present invention is furthermore based on the object of disclosing a method for determining an absolute position, by which generation of the absolute position as free of errors as possible is made possible.

This object is attained by determining the reference value as a function of at least one of the scanning signals of the code word.

It is an aspect of the present invention that the code includes an irregular sequence of fields with properties which are inverse in relation to each other (for example transparent and non-transparent fields, or magnetic and non-magnetic fields), and that each code element is formed by only a single field. Here, the position measuring arrangement may have the following characteristics:

a code including a sequence of code elements arranged one behind the other in the measuring direction X, in which several sequential code elements constitute a code word containing absolute position information, a scanning arrangement, having a detector unit with several detector elements for scanning the code elements which respectively constitute a code word, and for forming at least one analog scanning signal within a code element, an evaluating unit with assessment arrangements, in which the at least one scanning signal from a code element is supplied to respectively one of the assessment arrangements, and by which information regarding the corresponding code word can be formed by comparing the scanning signal with at least one reference signal, wherein the absolute position information can be derived from the information contained in several scanned code elements, at least one adaptation arrangement for determining the reference value as a function of at least one of the scanning signals of the code elements.

The method to be executed here may include the following method:

scanning of a code including a sequence of code elements arranged one behind the other in the measuring direction X, in which several sequential code elements constitute a code word containing absolute position information, generating at least one analog scanning signal within each one of the scanned code elements, comparing the scanning signal with at least one reference value and creation of information for the respective code element as a function thereof, and determining the reference value as a function of at least one of the scanning signals of the code elements.

In this case the reference value is a triggering threshold, and a check is made by the comparison whether the momentary amplitude lies above or below the triggering threshold. Depending from that, the corresponding code word is assigned the digital value "0" or "1" as the information A further aspect of the present invention is that the code includes a sequence of code elements arranged one behind the other in the measuring direction, and each code word again is composed of two partial areas having properties which are inverse with respect to each other. In this case the partial areas of a code element which are inverse with respect to each other are arranged sequentially in the measuring direction, or are arranged next to each other transversely in relation to the measuring direction. Then the position measuring arrangement may have the following characteristics:

a scanning arrangement with several detector elements for scanning several code elements and for forming at least one analog scanning signal within each partial area of the scanned code elements, an evaluating unit with assessment arrangements, in which the scanning signals from the partial areas of a code element are fed to one of the evaluating units and with which it is possible to check whether the result of a comparison of the respective scanning signals of the partial areas of a code element lies above or below at least one reference value, and as a function of which information can be formed regarding the corresponding code element, wherein the evaluation unit includes an adaptation arrangement for determining the reference value as a function of the signal amplitude of at least one of the scanning signals.

The method which can be employed by this position measuring arrangement may include:

scanning of a code having a sequence of code elements arranged one behind the other in the measuring direction, in which the elements respectively include two partial areas which are complementary to each other, generating at least one analog scanning signal within each partial area of the scanned code elements, checking whether the result of a comparison lies above or below at least one reference value, and the formation of information as a function thereof, by which the reference value is determined as a function of the amplitude of at least one of the scanning signals.

Here, the reference value can merely be a triggering threshold, and a check is made by the comparison whether the difference between the momentary amplitudes of the scanning signals of the two partial areas lies above or below the triggering threshold. As a function thereof, the appropriate code element is assigned the digital bit value "0" or "1" as information. In addition, the at least one reference value can define a range, and a check is made by the comparison whether the difference between the momentary amplitudes of the scanning signals of the two partial areas lies within or outside of this range. If the difference lies within this range, an error report regarding the respective code element is generated as the information. The error report is generated if the difference falls below a value determined by the reference value. The error report is an indication that the generated bit value is unreliable. By presetting several reference values it is also possible to determine the degree of dependability of a bit value.

It is intended by exemplary embodiments represented in the drawings to explain the concept on which the present invention is based and further characteristics and variants of the present invention.

DETAILED DESCRIPTION OF THE PREFERRED EMBODIMENTS

The present invention will be described by a code C, in which each code element C1, C2, C3 includes two partial fields, or respectively partial areas C1A, C1B, C2A, C2B, as well as C3A, C3B, which are designed inverted, or respectively complementary to each other. These partial fields can be arranged next to each other transversely with respect to the measuring direction X or, in a particularly advantageous manner, following each other in the measuring direction X, as represented in the example. For reasons of clarity, these partial areas will only be designated as A and B later on.

In this counter-phase arrangement, the code elements are designed in such a way that an at least approximately equal ratio of properties which are complementary to each other exists at least over the length of a respective scanning range, from which the reference value, which will be later described in greater detail, is obtained. It is assured by the counter-phase arrangement that the ratio is always 1:1.

However, the present invention is not limited to this special code, it can also be employed when every code word includes a single field, i.e. has only one of the two properties which are complementary to each other. In this case the code elements should be arranged in such a way that the same ratio of the two properties which are complementary to each other, i.e. code elements with the logical "0" and the logical "1", exists over the length of a respective scanning range, from which the reference value, which will be later described in greater detail, is obtained. Thus, in connection with an optically scannable code, approximately the same number of bright fields and dark fields. This is for example achieved by the arrangement described in EP 1 206 684 B1, in which several code words are arranged folded into each other, in that code elements of a further code word are inserted into the sequence of the code elements of a code word, and the code elements of the one code word are complementary to the code elements of the folded-in further code word.

Figure 1:
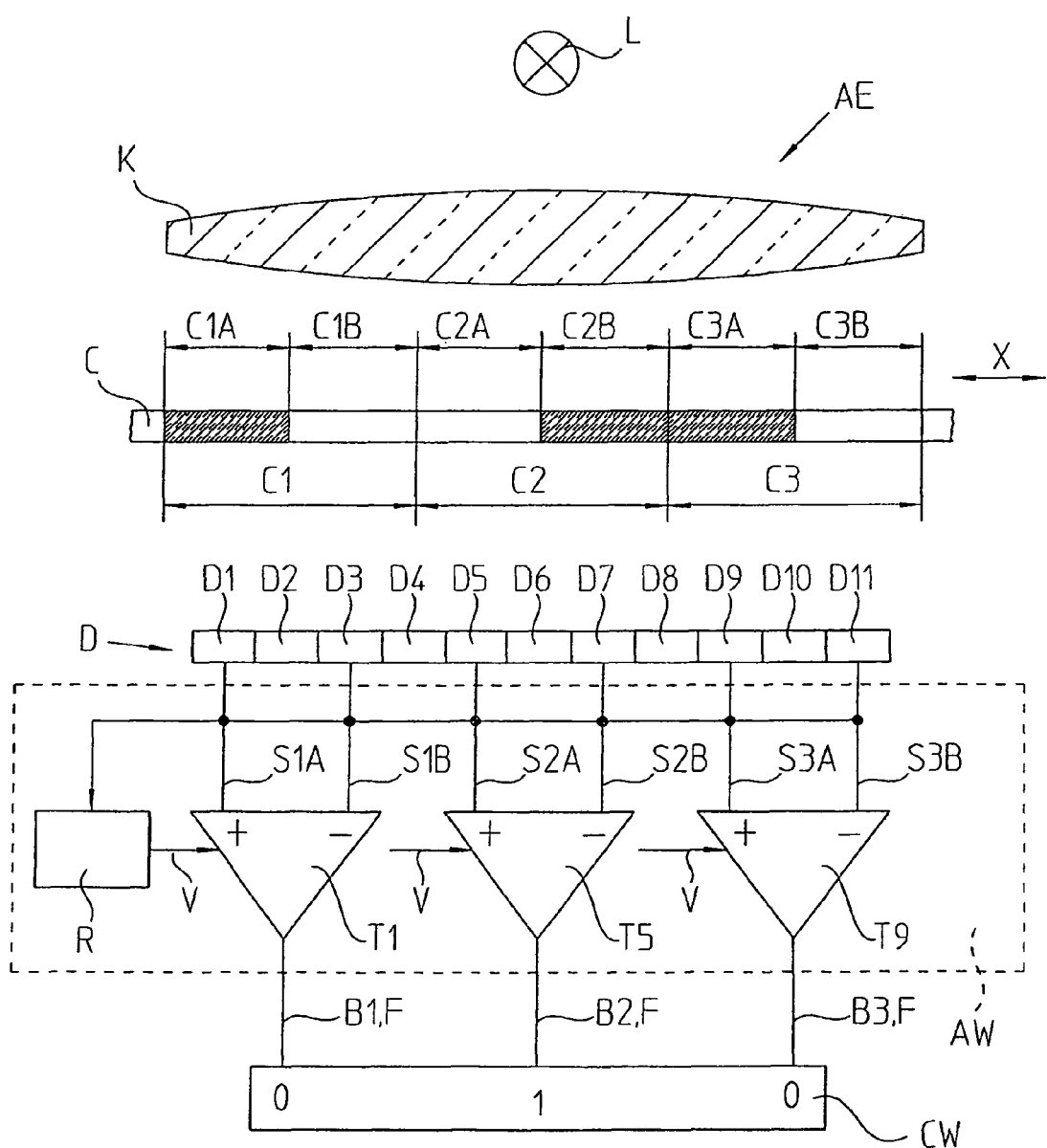
FIG. 1 shows an embodiment of a position measuring arrangement in a schematic representation in accordance with the present invention.

A position measuring arrangement designed in accordance with the present invention is schematically represented in FIG. 1. This position measuring arrangement operates in accordance with the optical scanning principle, in which a code C is scanned by the transmitted light method. A scanning arrangement AE, which is arranged movable in relation to the code C in the measuring direction X, is used for scanning the code C.

The code C includes a sequence of code elements C1, C2, C3 of equal length, which are arranged one behind the other in the measuring direction X. In turn, each code element C1, C2, C3 includes two partial areas A and B of equal length, which are arranged next to each other and immediately following each other in the measuring direction X and are designed complementary to each other. Here, complementary means that they have inverse properties, i.e. in accordance with the optical scanning principle they are transparent and non-transparent or, in accordance with the incident light principle, reflecting and respectively non-reflecting.

The sequential code C is scanned by the scanning arrangement AE, which contains a light source L, whose light illuminates several sequential code elements C1, C2, C3 through a collimator lens K. The light is modulated by the code C as a function of position, so that a position-dependent light distribution is created behind the code C, which is detected by a detector unit D of the scanning arrangement AE.

The detector unit D is a line sensor, or respectively an array of a sequence of detector elements D1 to D11 arranged in the measuring direction X. In every relative position, at least one detector element D1 to D11 is specifically assigned to each partial area A, B of the code elements C1, C2, C3, so that in each relative position of the detector unit D with respect to the code C an analog scanning signal S1A to S3B is obtained from each partial area A, B. These scanning signals S1A to S3B are conducted to an evaluation unit AW, which respectively processes the two scanning signals S1A, S1B, S2A, S2B, S3A, S3B of the two partial areas C1A, C1B, C2A, C2B, C3A, C3B of a code element C1, C2, C3, in particular compares them with each other and, by this comparison, generates an information for each code element C1, C2, C3 in the form of a digital value, or respectively of a bit B1, B2, B3. A sequence of several digital values B1, B2, B3 results in a code word CW, which defines the absolute position. In case of a shift of the detector unit D in relation to the code C by the width, or respectively length of one code element C1, C2, C3, a new code word CW is generated, and a multitude of different code words CW is formed over the measuring range which is to be absolutely measured.

FIG. 1 shows a momentary position of the code C relative to the scanning arrangement AE. The detector elements D1 to D11 are arranged following each other at a distance of half the width of a partial area C1A to C3B of the code C. By this it is assured that in any position at least one detector element D1 to D11 is unequivocally assigned to a partial area C1A to C3B and does not scan a transition area between two partial areas C1A to C3B. In the position represented, the partial area C1A is scanned by the detector element D1, and the partial area C1B by the detector element D3. The detector elements D1, D3 detect the light distribution and, as a function of the light intensity, generate an analog scanning signal S1A, S1B proportionally to the light intensity. Since the two partial areas C1A and C1B are designed complementary to each other, the intensities of the scanning signals S1A and S1B are inverse to each other, therefore the signal levels are widely separated from each other.

Now this signal distance is employed for generating the binary information B1 by checking which one of the two scanning signals S1A, S1B of the code element C1 is larger. This check can be performed by forming a quotient or by forming a difference. Difference formation is employed in the example for which, in accordance with FIG. 1, respective assessment arrangements T1, T5, T9 are used. In the exemplary embodiment the assessment arrangements are respectively triggering modules T1, T5, T9. The triggering module T1 generates B1=0, if S1A is less than S1B, and B1=1, if S1A is greater than S1B. A check is therefore made whether the difference is greater or smaller than a reference value O, wherein the reference value O=0 in the greater/smaller comparison. Binary information B2 and B3 is obtained in the same way by scanning the code elements C2, C3 and comparing the analog scanning signals S2A, S2B, S3A, S3B of the partial areas C2A, C2B, C3A, C3B of respective code elements C2, C3 by further assessment arrangements T5, T9.

Thus, a first sequence of partial areas A, B, which are designed to be complementary to each other, is assigned a first digital value, and a second sequence of partial areas A, B, which are designed to be complementary to each other, is assigned a second digital value. In the example, the sequence opaque→transparent is assigned the value 0, and the sequence transparent→opaque the value 1.

Since the two partial areas A and B of each code element C1, C2, C3 are complementary to each other, the interference spacing of the scanning signals S1A, S1B, as well as S2A, S2B and S3A, S3B is very large. A change in the light intensity of the light source L affects the scanning signals S of both partial areas A and B equally.

Based on the complementary design of respectively two partial areas A, B of a code element C1, C2, C3, respectively analog scanning signals S1A, S1B, S2A, S2B, S3A, S3B, the amount of whose difference exceeds a reference value V, are necessarily generated by scanning these partial areas A, B in the correct operational mode of the position measuring arrangement. A good error check is made possible by observing these difference values. The basis of this error check is that it can be assumed that, when the difference value is downwardly exceeded by a predetermined amount, the binary information B1, B2, B3 is unreliable, so that therefore an error signal F is generated in connection with this binary information B1, B2, B3, or that only an error signal F is generated in place of the binary information B1, B2, B3.

Figure 2:
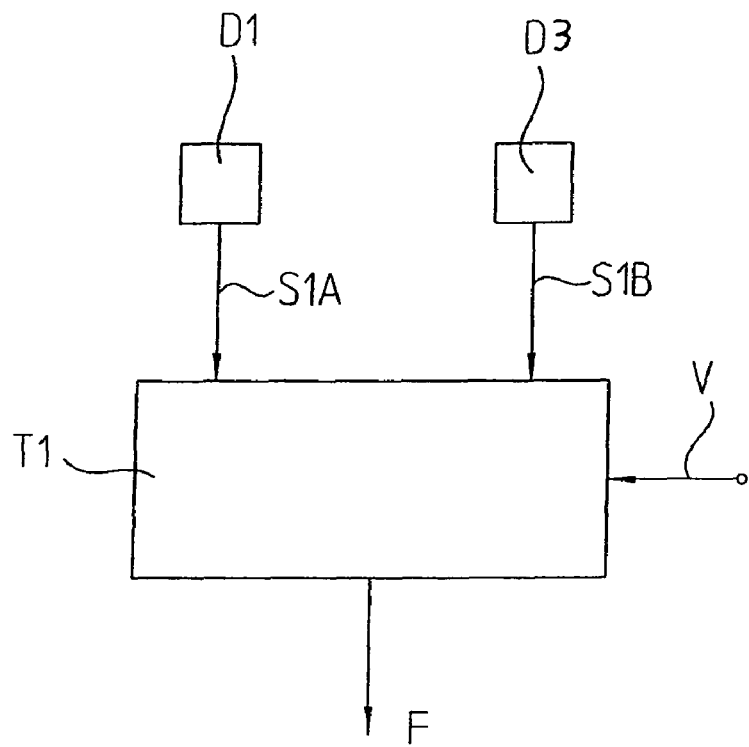
FIG. 2 shows the principle of a possible error check to be used with the position measuring arrangement of FIG. 1 in accordance with the present invention.
Figure 3:
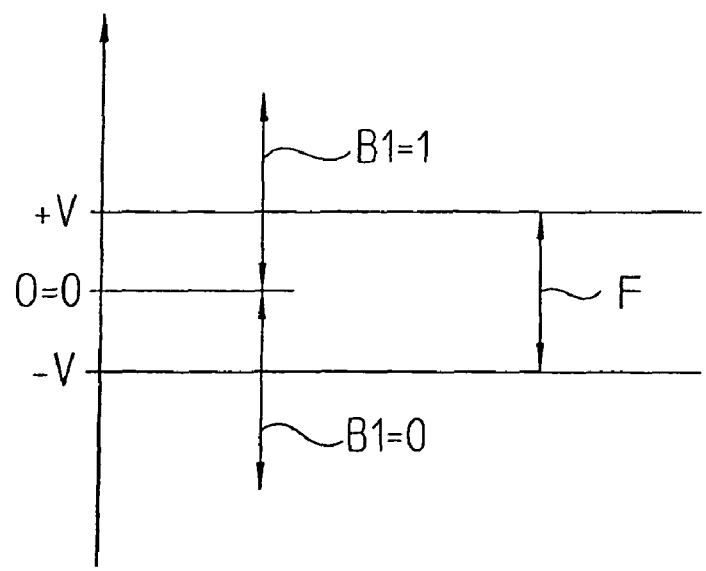
FIG. 3 shows possible signals of the error check in accordance with FIG. 2.

The principle of generating the error signal F is represented in FIG. 2 by the scanning signals S1A and S1B. The analog scanning signals S1A and S1B of the code element C1 are supplied to the assessment arrangement T1. The assessment arrangement T1 compares the difference formation (S1A−S1B) and checks whether or not the difference amount exceeds a reference value V in size. If the difference amount (S1A−S1B) does not exceed the reference value V, i.e. lies within the range of −V to +V predetermined by the reference value, an error signal F is output. These signal relationships are represented in FIG. 3.

The function of comparing the scanning signals S1A and S1B, as well as the function of checking the result of the comparison, are together integrated in the assessment arrangement T1. The assessment arrangements designed as triggering modules T1, T5, T9 are here window triggers, also called window comparators.

In accordance with the present invention, an adaptation arrangement R is now provided, by which this range (−V to +V) is determined as a function of at least one of the scanning signals S1A to S3B. In the example in accordance with FIG. 1, the adaptation arrangement R is used for determining the reference value, in this case the range (−V to +V) in particular, as a function of all scanning signals S1A to S3B which contribute to the formation of the code word CW. All scanning signals S1A to S3B, which contribute to the formation of the code word CW, are added up for this purpose. A value W, which is proportional to this sum, is determined by the adaptation arrangement R, and by this the reference value V, which fixes the range (from −V to +V) is supplied to the assessment arrangement T1, T5, T9. The determination of the reference value V can take place in accordance with linear or non-linear functions, for example:

$$V = P^* (\text{the sum of all scanning signals } S1A \text{ to } S3B)$$

or $$V = P^* (\text{the sum of all scanning signals } S1A \text{ to } S3B)^2$$

or $$V = P^* (\text{the sum of all scanning signals } S1A \text{ to } S3B) + K,$$
wherein P=proportionality factor and K=a constant.

In case of the code C becoming contaminated dirty, the amplitudes of the scanning signals S1A to S3B become lower, as a result of which the differences between the scanning signals S1A, S1B, S2A, S2B, as well as S3A, S3B of respectively two partial areas A, B of a code element C1, C2, C3 are also reduced. In order to still reliably obtain a code information B1, B2, B3 in case of such an influence, the value V is continuously reduced during the operation, i.e. dynamically, in particular proportionally with respect to the reduction of the amplitudes, and therefore also the range (−V to +V). The availability of the position measuring arrangement is increased by this step, since fewer error signals F are generated. The probability of a failure of the position measuring arrangement is significantly reduced by this and reliability is therefore increased. The added-up scanning signals S1A to S3B represent electrical values, in particular electrical currents.

For taking local, or respectively partial influences into consideration it can be advantageous if not all scanning signals S1A to S3B are used for forming the reference value V or O. For example, in a first adaptation arrangement a first reference value, and therefore a first range, can be determined from the scanning signals of a first scanning area of the code C, and a second reference value in a second adaptation arrangement, and therefore a second range from the scanning signals of a second scanning area of the code C. The first reference value is supplied to the assessment arrangements, which assess the scanning signals from the first scanning area, or respectively the differences obtained from them. The second reference value is supplied to the assessment arrangements, which assess the scanning signals from the second scanning area, or respectively the differences obtained from them. In this manner it is possible by further adaptation arrangements to determine individual local reference values V and/or O for several scanning areas of the code C, wherein the scanning areas used for this can respectively have the same or different lengths in the measuring direction X. It is also possible to form an individual reference value for each individual code element merely from the scanning signals of the two partial areas of this code element.

Figure 4:
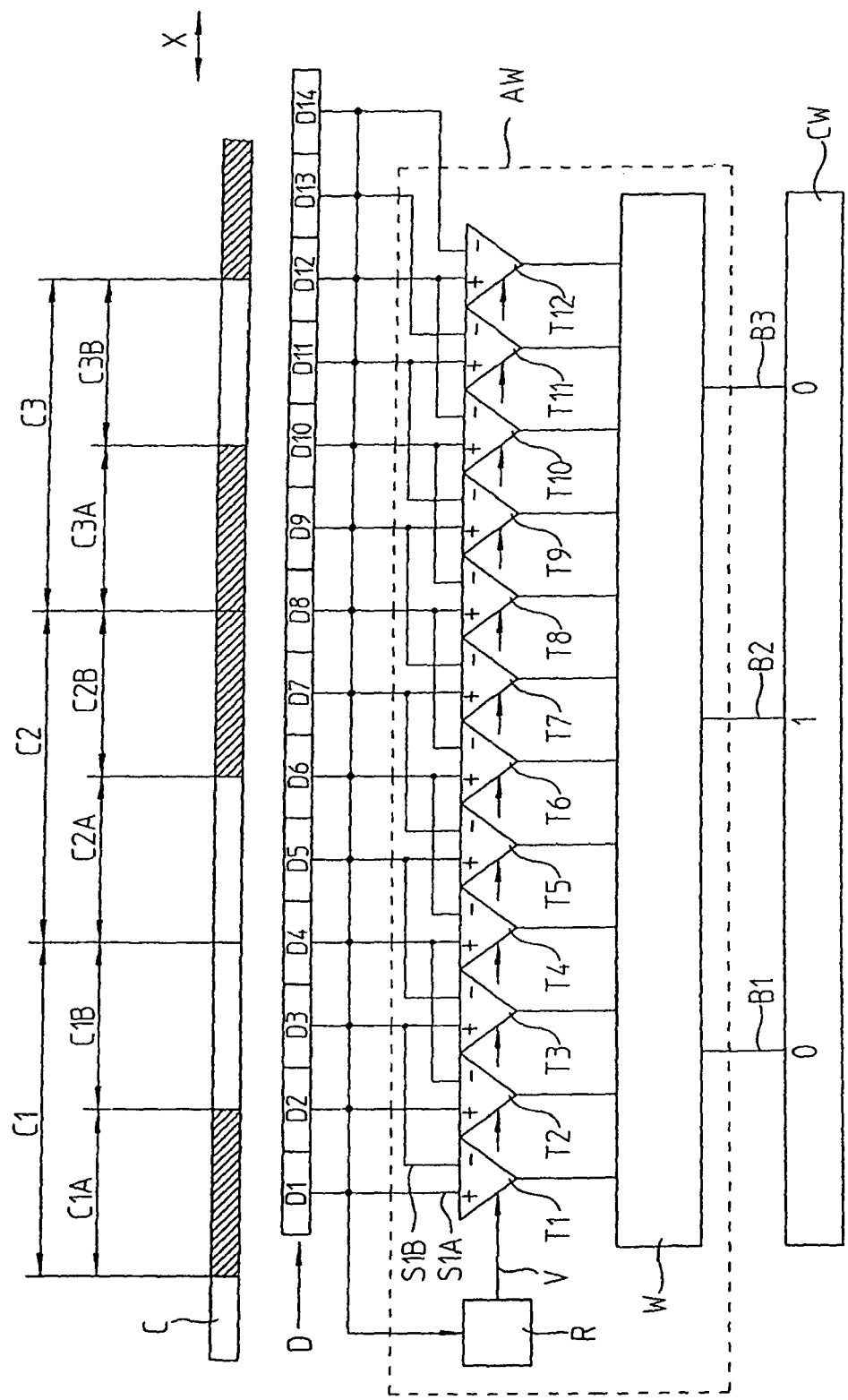
FIG. 4 represents a second embodiment of a position measuring arrangement in accordance with the present invention.

For reasons of clarity, only the triggering components T1, T5, T9 are represented in FIG. 1, from which the code word CW is formed in the momentary position represented. The complete arrangement of the assessment arrangements T1 to T12 is now represented in FIG. 4. In the represented momentary position of the scanning arrangement AE and the code C, the outlets of the assessment arrangements T1, T5 and T9 are used for forming the code word CW, since the odd-numbered detector elements D1, D3, D5, D7, D9 and D11 are located opposite unequivocal partial areas A, B of code elements C1, C2, C3, as explained in detail in FIG. 1. In a momentary position displaced by half the length of a partial area A, B, the outlets of the assessment arrangements T2, T6 and T10 are used for forming the next code word CW, because then the even-numbered detector elements D2, D4, D6, D8, D10 and D12 are located opposite unequivocal partial areas A, B of code elements C1, C2, C3.

Which assessment arrangement T1 to T12 is employed for the correct formation of a code word CW is determined in a selection arrangement W. Examples of the design and functioning of this selection arrangement W have been described in already mentioned DE 102 44 235 A1, to which reference is made here.

In the course of the operation of the position measuring arrangement, the reference value V is advantageously continuously matched (dynamically, on-line) to the actual scanning signals of the code. However, in connection with an electrical current-saving clocked operation of the position measuring arrangement, it can be practical to take up the reference value only in a stable state of the evaluation unit. Therefore, not the reference value present at the start of a clock cycle is taken up as the actual reference value, but a reference value which appears later during the clock cycle. It can also be advantageous if the reference value is stored at a predetermined point in time of the clock cycle, and this stored reference value is employed until a fresh reference value is stored. In this connection it is also possible to form the reference value actually used for forming the information from several previously determined and stored reference values, for example by forming the mean value from several reference values determined during previous clock cycles.

The two partial areas A, B of each code element C1, C2, C3 can be designed to be optically scannable, in which case a partial area A is designed to be transparent to or reflecting the scanning light, and the other partial area B opaque or non-reflecting. However, the present invention is not restricted to the optical scanning principle, the code elements can also be designed to be magnetically, inductively or capacitively scannable.

The reference value +V, −V is continuously matched to the actual properties of the code C by continuously taking the momentary signal amplitudes of the scanning signals S into consideration. A sort of updating, or post-regulation of the reference value +V, −V takes place.

The absolute position measuring arrangement can be employed for the measurement of linear or rotary movements, wherein the code C is attached to one of the movable objects, and the scanning arrangement AE to the other object to be measured. In this case the code C can be directly attached to the object to be measured or to a scale which in turn is then connected with the object to be measured.

Here, the object to be measured can be the table and the carriage of a machine tool, or of coordinate-measuring machinery, or the rotor and the stator of an electric motor.

The foregoing description is provided to illustrate the present invention, and is not to be construed as a limitation. Numerous additions, substitutions and other changes can be made to the invention without departing from its scope as set forth in the appended claims.

We claim:

1. A position measuring arrangement, comprising:
   a code comprising code elements arranged one behind the other in a measuring direction, wherein said code elements comprise sequential first and second code elements which define a code word containing absolute position information;
   a scanning arrangement comprising a detector unit comprising:
       detector elements for scanning said first code elements and said second code elements and forming scanning signals with respect to said first code elements and said second code elements;
       an evaluating unit comprising an assessment arrangement that receives said scanning signals and forms information corresponding to said first code elements and said second code elements by a reference value; and
       an adaptation arrangement that determines said reference value as a function of at least one of said scanning signals with respect to said first code elements and said scanning signals with respect to said second code elements.

2. The position measuring arrangement in accordance with claim 1, wherein said sequential first and second code elements have properties which are designed to be complementary to each other, and said sequential first and second code elements are designed and arranged in such a way that approximately a same ratio between said properties that exists at least over a length of respectively one scanning area from which said reference value is obtained.

3. The position measuring arrangement in accordance with claim 1, wherein each of said sequential first and second code elements comprises two partial areas which are complementary to each other;
   said detector unit is designed for scanning said sequential first and second code elements and for forming a first scanning signal within one of said two partial areas and a second scanning signal within another of said two partial areas corresponding to said scanned sequential first and second code elements;
   said first and second scanning signals are supplied to said assessment arrangement, wherein via said assessment arrangement it is possible to check whether a result of a comparison of said first and second scanning signals lie above or below said reference value, and by which it is possible as a function thereof to form said information for respective sequential code elements.

4. The position measuring arrangement in accordance with claim 3, wherein said assessment arrangement forms a difference between said first and second scanning signals.

5. The position measuring arrangement in accordance with claim 3, wherein said assessment arrangement outputs an error signal when a difference between said first and second scanning signals is located within a range defined by said reference value.

6. The position measuring arrangement in accordance with claim 3, wherein each of said two partial areas of said sequential first and second code element have optical properties which are complementary to each other.

7. The position measuring arrangement in accordance with claim 1, wherein said reference value is proportional to a sum of said scanning signals with respect to said first code elements and said second code elements.

8. The position measuring arrangement in accordance with claim 7, wherein said reference value is proportional to a sum of signal amplitudes of said scanning signals of said first code elements and said second code elements arranged one behind the other in said measuring direction which defines said code word containing said absolute position information.

9. The position measuring arrangement in accordance with claim 3, wherein said reference value is proportional to a sum of said first scanning signal and second scanning signal of said two partial areas of at least one of said first code elements and second code elements.

10. The position measuring arrangement in accordance with claim 9, wherein said reference value is proportional to a sum of signal amplitudes of said first scanning signal and said second scanning signal of said two partial areas of said first and second code elements arranged one behind the other in said measuring direction which defines said code word containing said absolute position information.

11. The position measuring arrangement in accordance with claim 3, wherein a first sequence of said two partial areas which are complementary to each other forms a digital 0 as said information corresponding to said first code elements; and
   a first sequence of said two partial areas which are complementary to each other forms a digital 1 as said information corresponding to said second code elements.

12. A method for absolute position measuring comprising:
   scanning a code comprising code elements arranged one behind the other in a measuring direction, wherein said code elements comprise sequential first and second code elements which define a code word containing absolute position information, wherein said scanning comprises moving a scanning arrangement relative to said code elements;
   generating scanning signals within said first code elements and said second code elements;
   determining a reference value as a function of at least one of said scanning signals within said first code elements and said scanning signals within said second code elements; and
   forming information regarding said sequential first and second code elements from said scanning signals via said reference value.

13. The method in accordance with claim 12, further comprising:
   comparing said scanning signals with said reference value; and
   creating information for said sequential first and second code elements as a function of said comparing.

14. The method in accordance with claim 13, further comprising:
   scanning said sequential first and second code elements, wherein each of said sequential first and second code elements comprises two partial areas which are complementary to each other;
   generating a first scanning signal within one of said two partial areas and a second scanning signal within another of said two partial areas of said sequential first and second code elements;

forming a comparison result by comparing said first and second scanning signals with each other;

checking whether said comparison result lies above or below said reference value, and forming said information for said sequential first and second code elements as a function thereof.

15. The method in accordance with claim 14, wherein said comparing comprises forming a difference between analog scanning signals from each of said two partial areas of said sequential first and second code elements.

16. The method in accordance with claim 15, wherein an error signal is formed as said information when said difference lies within a range predetermined by said reference value.

17. The method in accordance with claim 14, wherein said first and second scanning signals are analog in nature and said reference value is determined from a sum of said first and second scanning signals.

* * * * *